United States Patent
Miura et al.

(10) Patent No.: US 10,583,697 B2
(45) Date of Patent: Mar. 10, 2020

(54) WHEEL RESONATOR

(71) Applicant: TIGERS POLYMER CORPORATION, Toyonaka-shi, Osaka (JP)

(72) Inventors: Takatsugu Miura, Kobe (JP); Shogo Kuroda, Kobe (JP); Toshinobu Doi, Kobe (JP); Tetsuji Miyazaki, Kobe (JP); Michio Kijima, Kobe (JP)

(73) Assignee: TIGERS POLYMER CORPORATION, Osaka (JP)

( * ) Notice: Subject to any disclaimer, the term of this patent is extended or adjusted under 35 U.S.C. 154(b) by 78 days.

(21) Appl. No.: 15/919,349

(22) Filed: Mar. 13, 2018

(65) Prior Publication Data

US 2019/0160866 A1    May 30, 2019

(30) Foreign Application Priority Data

Nov. 28, 2017    (JP) .................................. 2017-227882

(51) Int. Cl.
*B60C 19/00* (2006.01)
*B60B 21/12* (2006.01)
*B23K 31/02* (2006.01)

(52) U.S. Cl.
CPC ............ *B60C 19/002* (2013.01); *B60B 21/12* (2013.01); *B23K 31/02* (2013.01); *B60B 2900/131* (2013.01); *B60B 2900/133* (2013.01)

(58) Field of Classification Search
CPC .............................. B60B 21/12; B60C 19/002
See application file for complete search history.

(56) References Cited

U.S. PATENT DOCUMENTS

| 7,690,410 B2* | 4/2010 | Kamiyama | B60B 3/044 |
| | | | 152/381.5 |
| 8,418,735 B2* | 4/2013 | Kamiyama | B60B 1/08 |
| | | | 152/381.6 |
| 9,431,000 B2* | 8/2016 | Kamiyama | G10K 11/172 |
| 9,649,892 B2* | 5/2017 | Ishii | B60B 21/026 |
| 2015/0321509 A1* | 11/2015 | Kamiyama | B60B 21/12 |
| | | | 301/95.101 |
| 2016/0001596 A1* | 1/2016 | Kamiyama | B60B 21/02 |
| | | | 301/95.104 |
| 2017/0021666 A1* | 1/2017 | Kamiyama | B60B 21/10 |

FOREIGN PATENT DOCUMENTS

JP    2014-084014 A    5/2014

* cited by examiner

*Primary Examiner* — Jason R Bellinger
(74) *Attorney, Agent, or Firm* — Troutman Sanders LLP

(57) ABSTRACT

A wheel resonator, which is provided by integrating a first member having a first welding surface with a second member having a second welding surface and includes a volume chamber and a communicating tube. The volume chamber has a flat shape and is configured to extend along an outer surface of a vehicle wheel when the wheel resonator is attached to the vehicle wheel. The first welding surface and the second welding surface are welded to each other, and are provided on a single welding plane. The welding plane extends in a circumferential direction and a width direction of the vehicle wheel when the wheel resonator is attached to the vehicle wheel, is a plane on which the volume chamber is divided into two volume portions, and is a plane on which the communicating tube is divided into two communication portions. The communicating tube extends along the welding plane.

8 Claims, 4 Drawing Sheets

WHEEL RESONATOR

CROSS-REFERENCE TO RELATED APPLICATION

This application claims priority from Japanese Patent Application No. 2017-227882 filed with the Japan Patent Office on Nov. 28, 2017, the entire content of which is hereby incorporated by reference.

BACKGROUND

1. Technical Field

The present disclosure relates to a wheel resonator.

2. Related Art

When a vehicle such as an automobile runs on a rough road surface or the like, a so-called road noise is made. It is known that one of reasons to cause a road noise is air column resonance generated inside a tire. In recent years, a noise-reduction technology of the whole vehicle has been improved to reduce an indoor noise level, whereas a road noise caused by air column resonance inside a tire has been becoming more noticeable. In view of this, in order to reduce a road noise, it is known that a resonator including a volume chamber and a communicating tube is provided. In particular, a technology regarding a wheel resonator that is attached to a vehicle wheel to operate has been developed. According to this technology, a road noise is reduced by restraining air column resonance inside a tire by using a resonator provided inside the tire.

For example, JP-A-2014-84014 discloses a Helmholtz resonator mounted on a vehicle wheel to operate. This Helmholtz resonator includes an arc-shaped air chamber bent in a longitudinal direction and a communicating hole through which the inside and outside of the air chamber communicate with each other. This Helmholtz resonator disclosed in JP-A-2014-84014 is produced by a blow molding method. According to the technology disclosed in JP-A-2014-84014, it is possible to produce a resonator having a highly accurate edge at a low cost. It is also possible to restrain air column resonance inside a tire.

SUMMARY

A wheel resonator according to the present disclosure is provided by integrating a first member having a first welding surface with a second member having a second welding surface and includes a volume chamber and a communicating tube. The volume chamber has a flat shape and is configured to extend along an outer surface of a vehicle wheel when the wheel resonator is attached to the vehicle wheel. The first welding surface and the second welding surface are welded to each other, and are provided on a single welding plane. The welding plane extends in a circumferential direction and a width direction of the vehicle wheel when the wheel resonator is attached to the vehicle wheel, is a plane on which the volume chamber is divided into two volume portions, and is a plane on which the communicating tube is divided into two communication portions. The communicating tube extends along the welding plane.

DETAILED DESCRIPTION

Figure 1:
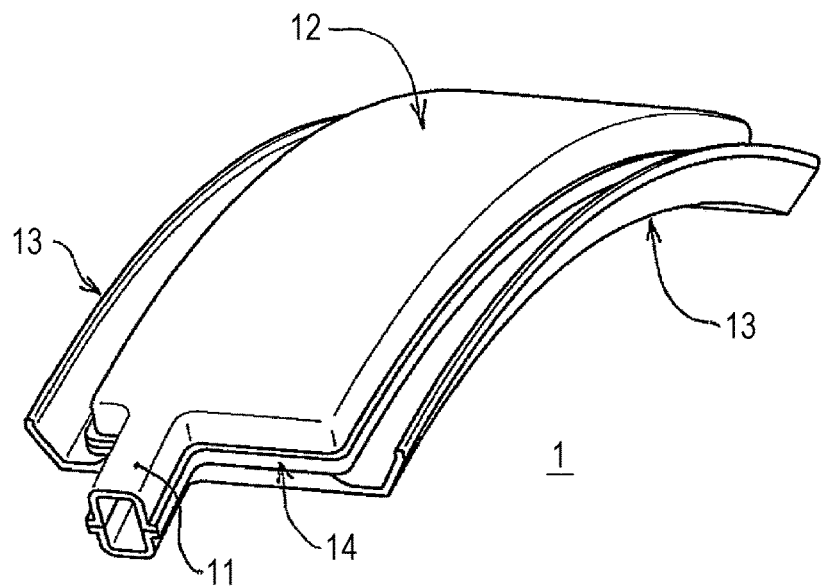
FIG. 1 is a perspective view illustrating a wheel resonator according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the technology disclosed in JP-A-2014-84014, a resonator is produced by blow molding. In order to further improve productivity, it is considered that a resonator is produced by, for example, molding a plurality of divided portions and welding those divided portions, instead of using the above technology.

Meanwhile, a resonator needs to have a resonance frequency corresponding to air column resonance inside a tire serving as a target to be silenced. Therefore, the resonator is produced to be resonant with a frequency very close to a specified target resonance frequency. However, it is difficult to accurately control the resonance frequency of the wheel resonator while improving productivity.

An object of the present disclosure is to provide a wheel resonator produced with high productivity and having a resonance frequency that does not easily deviate from a target resonance frequency.

The inventors have studied molding a plurality of divided portions and welding those divided portions to produce a resonator. However, it is found that, in a technology for welding divided portions, it is difficult to precisely control a welding height, a resonance frequency of a finished resonator therefore varies, and, as a result, it is difficult to accurately control the resonance frequency.

As a result of further diligent study, the inventors have found that, when divided portions of a resonator obtained by dividing the resonator on a specified dividing plane (welding plane) are molded, the resonance frequency does not easily deviate from a target resonance frequency while the productivity of production is being improved. Herein, this specified dividing plane (welding plane) is a plane on which both a volume chamber and a communicating tube included in the resonator are divided. In this way, the inventors have finished a wheel resonator of the present disclosure.

A wheel resonator according to the present disclosure is provided by integrating a first member having a first welding surface with a second member having a second welding surface and includes a volume chamber and a communicating tube. The volume chamber has a flat shape and is configured to extend along an outer surface of a vehicle wheel when the wheel resonator is attached to the vehicle wheel. The first welding surface and the second welding surface are welded to each other, and are provided on a single welding plane. The welding plane extends in a circumferential direction and a width direction of the vehicle wheel when the wheel resonator is attached to the vehicle wheel, is a plane on which the volume chamber is divided into two volume portions, and is a plane on which the communicating tube is divided into two communication portions. The communicating tube extends along the welding plane.

(First Wheel Resonator.)

In the first wheel resonator, ΔS/ΔV is preferably 0.5 times or more and 1.5 times or less as much as S/V, where a volume of the volume chamber is denoted by V, a cross-sectional area of the communicating tube is denoted by S, a change in the volume generated in the volume chamber due to an error of a unit length in a welding height is denoted by ΔV, and a change in the cross-sectional area generated in a cross-section of an opening of the communicating tube due to the error of the unit length in the welding height is denoted by ΔS (second wheel resonator). Further, in the first wheel resonator, HV is preferably is 0.5 times or more and 1.5 times or less as much as HC, where a height of a cross-section of an opening of the communicating tube in a wheel radial direction is denoted by HC and a height of the volume chamber in the wheel radial direction is denoted by HV (third wheel resonator).

In the first wheel resonator, the first member and the second member may be made of synthetic resin.

In the first wheel resonator, the communicating tube may be configured to extend from the volume chamber in the circumferential direction or width direction of the vehicle wheel when the wheel resonator is attached to the vehicle wheel.

In the first wheel resonator, the communicating tube may be configured to have a shape bent along the welding plane when the wheel resonator is attached to the vehicle wheel.

According to the wheel resonator (first wheel resonator) of the present disclosure, productivity of production is improved and a variation in a resonance frequency caused by a variation in the welding height is reduced. Thus, the resonance frequency does not easily deviate from a target resonance frequency. Further, according to the second wheel resonator or the third wheel resonator, it is possible to further reduce the variation in the resonance frequency.

Hereinafter, the present embodiment will be described with reference to the drawings by using a wheel resonator attached to a wheel of an automobile as an example. The present embodiment is not limited to individual embodiments described below. Modification embodiments thereof may be implemented.

Figure 2:
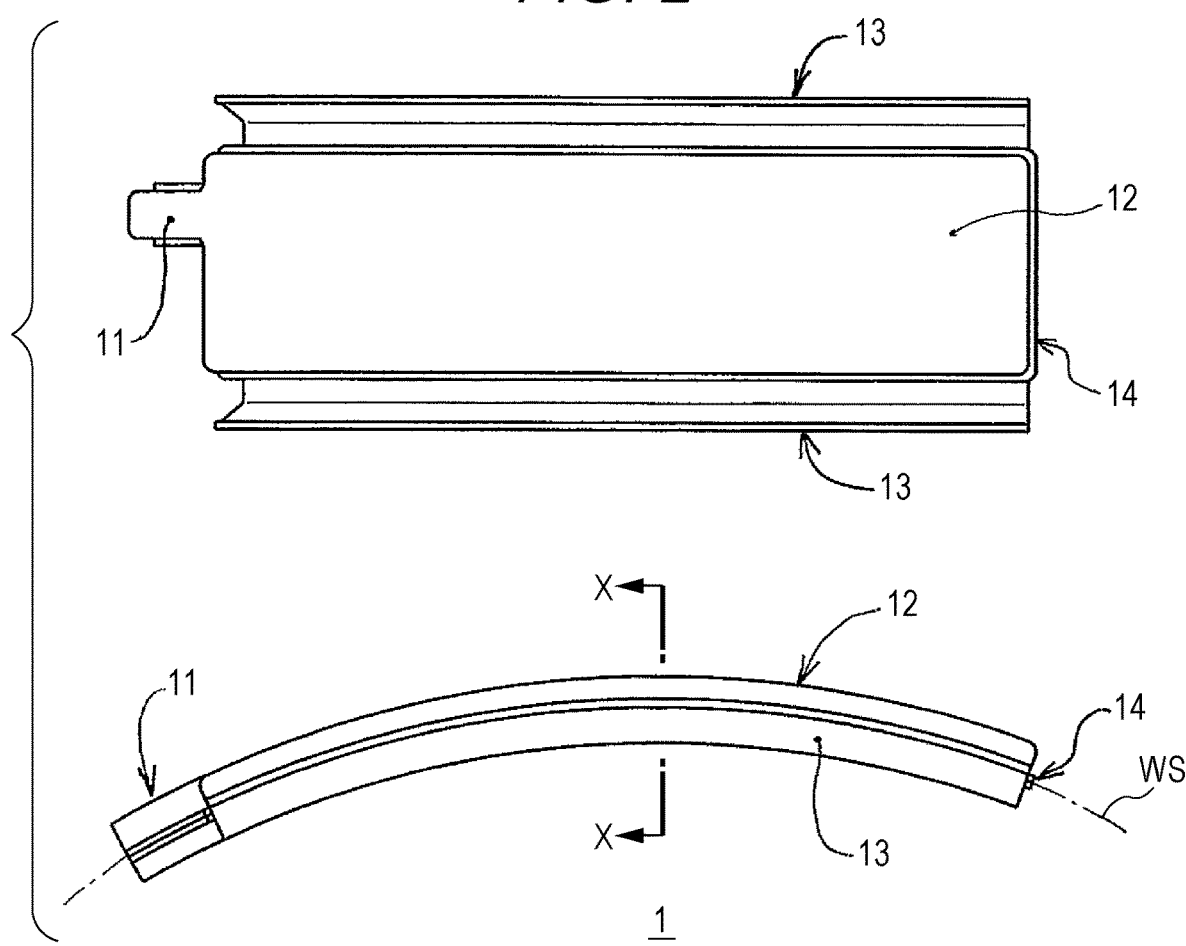
FIG. 2 is a top view and a side view illustrating the wheel resonator according to the first embodiment.
Figure 3:
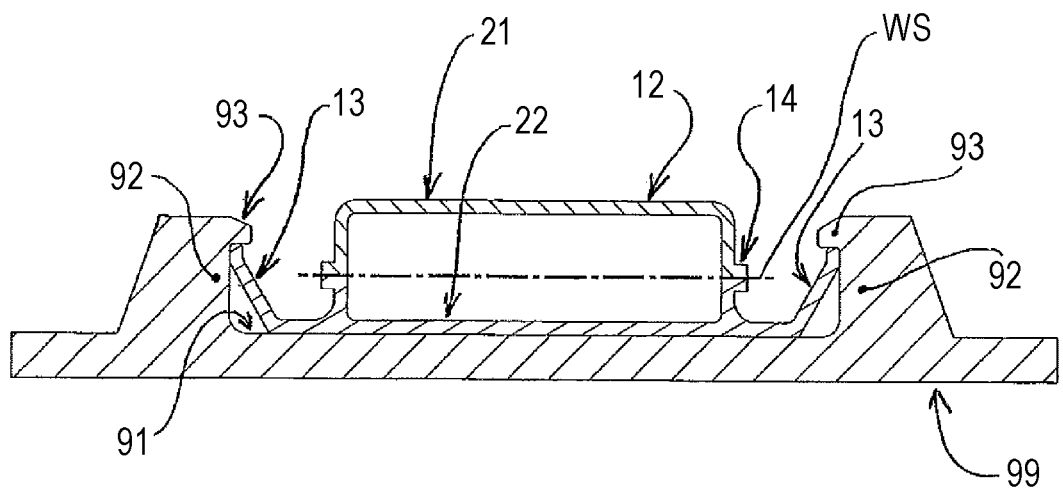
FIG. 3 is a cross-sectional view illustrating a state in which the wheel resonator according to the first embodiment is attached to a wheel.
Figure 4:
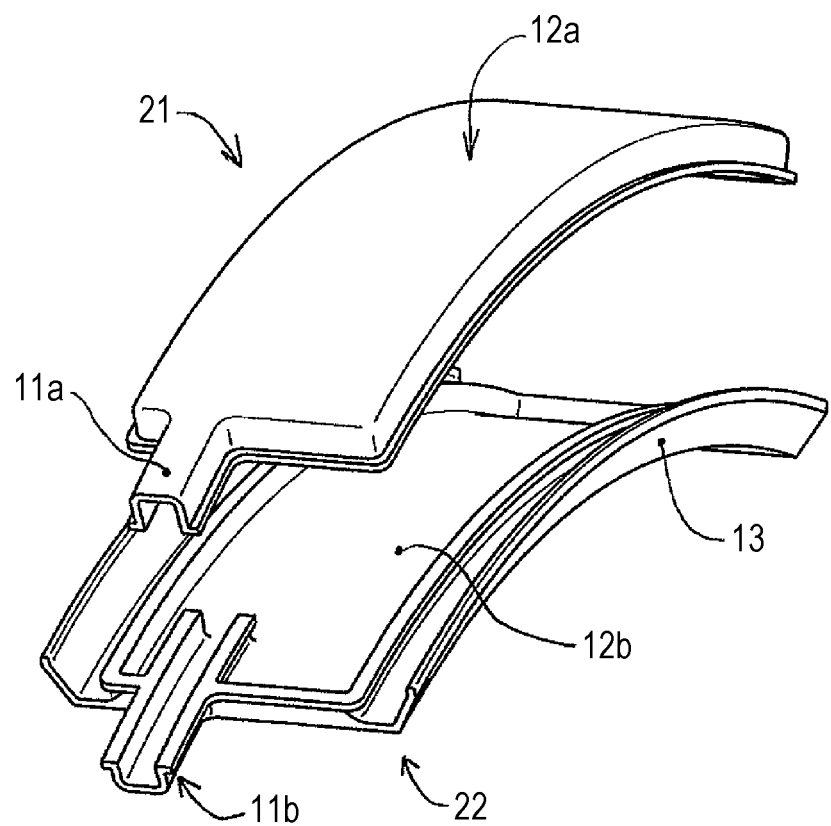
FIG. 4 is a perspective view illustrating constituent members of the wheel resonator according to the first embodiment.

FIG. 1 to FIG. 4 illustrate a wheel resonator 1 according to a first embodiment. FIGS. 1 and 2 illustrate external appearances of the wheel resonator 1. FIG. 3 illustrates a cross-sectional structure of the wheel resonator 1 attached to a wheel. FIG. 4 illustrates constituent members of the wheel resonator 1. Note that, in the following description, a circumferential direction indicates a circumference direction of a vehicle wheel to which the wheel resonator of the present embodiment is attached, a radial direction indicates a radial direction of the wheel, and a width direction indicates a width direction of the wheel, i.e., an extending direction of a central axis of the wheel.

Figure 5:
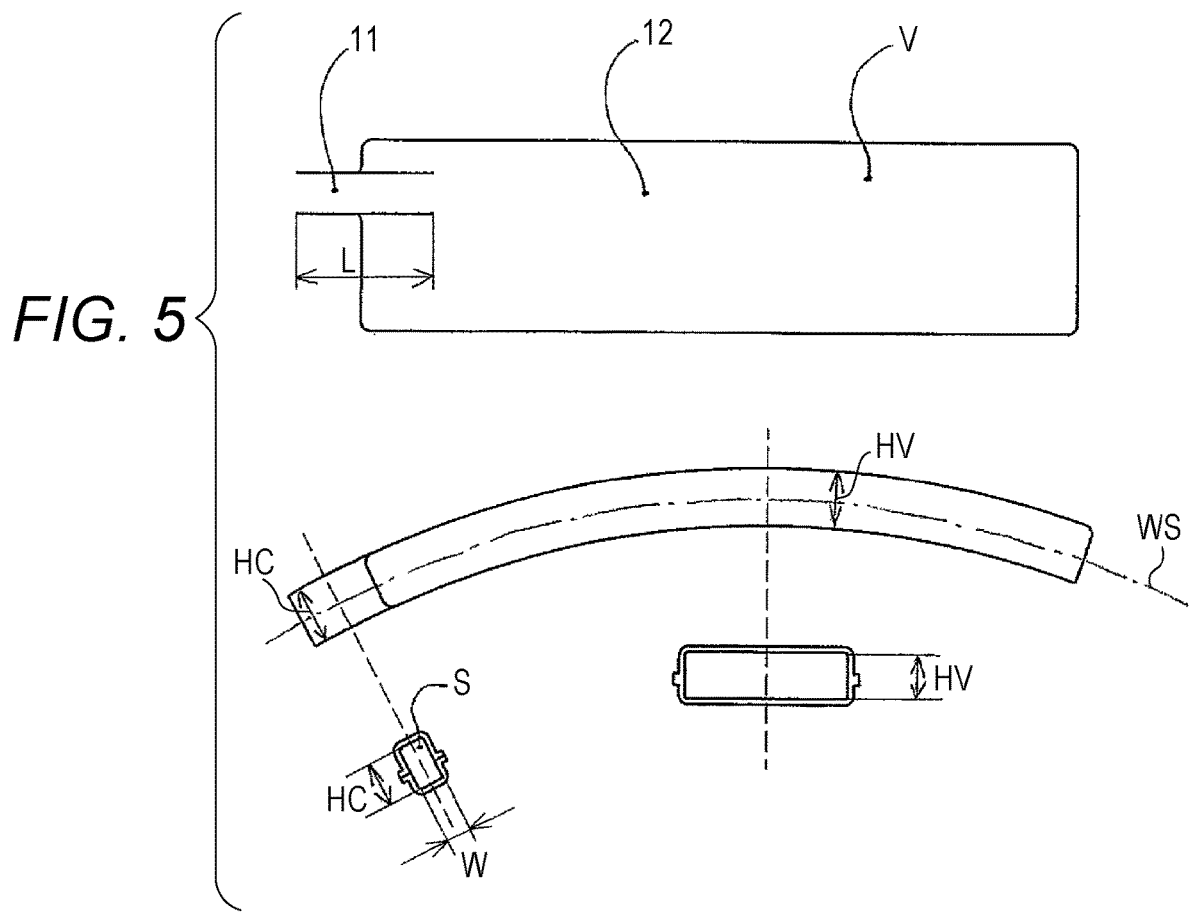
FIG. 5 is schematic views illustrating a shape of a volume chamber and a shape of a communicating tube of the wheel resonator according to the first embodiment.

The wheel resonator 1 is a Helmholtz resonator including a volume chamber 12 and a communicating tube 11. FIG. 5 schematically illustrates an overview of an air chamber serving as a Helmholtz resonator. The volume chamber 12 is a container having an internal space of a volume V. The communicating tube 11 is a tubular portion through which an internal space and an external space of the volume chamber 12 communicate with each other. A cross-sectional area of the tubular portion of the communicating tube 11 is denoted by S. A length of the tubular portion of the communicating tube 11 is denoted by L.

The wheel resonator 1 is attached to a vehicle wheel 99 to operate. A specific structure for attachment is not particularly limited. For example, as illustrated in FIG. 3, the wheel resonator 1 is attached to a wheel by using attaching portions 13 integrally molded with the wheel resonator 1. FIG. 3 is a cross-sectional view of part of the volume chamber 12 as seen along the circumferential direction of the wheel. A lower side of FIG. 3 indicates a central axis side of the wheel. An upper side of FIG. 3 indicates an internal space side of a tire.

The attaching portions 13 are plates along both side edges of the volume chamber 12 in the width direction. Further, the attaching portions 13 protrude from the volume chamber 12 in the width direction and the radial direction.

The wheel resonator 1 is attached to, for example, a well 91 formed in the wheel 99. This well 91 is formed to have a gutter shape extending in the circumferential direction. Walls 92 are provided on both sides of the well 91 in the width direction. When the walls 92 abut on tips of the attaching portions 13, an attaching position of the wheel resonator 1 in the width direction is determined. The walls 92 include locking portions 93 in outermost periphery portions thereof.

In a case where the wheel resonator 1 is attached to the wheel 99 in use, the volume chamber 12 is pressed to the well 91 while the attaching portions 13 are being elastically deformed. In this manner, the tips of the attaching portions 13 are fit into connection portions between the walls 92 and the locking portions 93.

The wheel resonator 1 is disposed in the wheel 99 so that, when the wheel resonator 1 is attached, the volume chamber 12 is brought into contact with an outer surface of the well 91. Further, the tips of the attaching portions 13 are locked in the locking portions 93 of the wheel and the walls 92 of the wheel. Accordingly, the wheel resonator 1 is fixed in the radial direction and the width direction. The wheel resonator 1 is preferably fixed also in the circumferential direction by further providing a locking portion, a protrusion, a recess, or the like.

The wheel resonator 1 is attached to the wheel 99. Specifically, the wheel resonator 1 is disposed in an internal space of the tire (not illustrated). The wheel resonator 1 is resonant with a resonance frequency $f_0$ (e.g., 200 Hz) determined on the basis of the volume V of the volume chamber 12, the cross-sectional area S of the communicating tube 11, the length L of the communicating tube 11, and the like. This restrains a noise caused by air column resonance generated inside the tire or the like.

A structure of the wheel resonator 1 will be described in more detail.

The volume chamber 12 has a flat shape extending along an outer surface of the wheel 99. That is, the volume chamber 12 has a flat shape having a smaller dimension (height) in the radial direction than dimensions in the circumferential direction and the width direction. This is to reduce the dimension in the radial direction in consideration of workability such as replacement of a tire and maintain the volume of the volume chamber 12. The volume chamber 12 has a hollow shape that extends along the circumferential direction and is bent in an arc shape. This arc corresponds to a shape of the well 91 of the wheel.

As illustrated in FIG. 4, the wheel resonator 1 includes a first member (upper member) 21 positioned on the outside in the radial direction and a second member (lower member) 22 positioned on the inside in the radial direction. A first welding surface of the first member 21 and a second welding surface of the second member 22 are welded to each other. In FIG. 1 to FIG. 3, a welded portion is illustrated as a welded portion 14. In the present embodiment, the first member 21 and the second member 22 are made of mutually weldable synthetic resin. Those members are typically produced by injection molding.

As illustrated in FIGS. 2 and 3, the first welding surface and the second welding surface are provided on a single curved plane or a single plane (hereinafter, collectively referred to "welding plane") extending in the circumferential direction and the width direction of the wheel. A welding plane WS typically forms a side surface of a cylinder or a cone embracing the well 91 on which the mounted resonator lies. The welding plane WS in FIGS. 2 and 3 may be inclined from the outer surface of the wheel 99 in the width direction and/or circumferential direction. The volume chamber 12 is divided into two volume portions 12a and 12b on the welding plane WS. The first welding surface of the first member 21 and the second welding surface of the second member 22 are welded on the welding plane WS while both the welding surfaces are abutting on each other. For welding, hot plate welding or laser welding may be used, and vibration welding is preferably used. In order to increase welding strength, a protrusion, a groove, a skirt, a holding portion, and the like may be formed in the welded portion 14 as appropriate.

The communicating tube 11 extends along the welding plane WS. For example, in the present embodiment, a tube line of the communicating tube 11 extends along the circumferential direction of the wheel. Further, the communicating tube 11 is divided into two communication portions 11a and 11b along the tube line on the welding plane WS.

Therefore, the first member 21, which is a constituent member of the wheel resonator 1, includes the first volume portion 12a and the first communication portion 11a. The first volume portion 12a and the first communication portion 11a are integrated with each other. Similarly, the second member 22, which is a constituent member of the wheel resonator 1, includes the second volume portion 12b and the second communication portion 11b. The second volume portion 12b and the second communication portion 11b are integrated with each other. Herein, the first volume portion 12a and the second volume portion 12b are obtained by dividing the volume chamber 12 into two portions on the welding plane WS in the radial direction of the wheel. Similarly, the first communication portion 11a and the second communication portion 11b are obtained by dividing the communicating tube 11 into two portions on the welding plane WS in the radial direction of the wheel. Further, in the present embodiment, the attaching portions 13 are provided in the second member 22.

Specific shapes of the first and second volume portions 12a and 12b and the first and second communication portions 11a and 11b obtained by dividing the volume chamber 12 and the communicating tube 11 on the welding plane WS are not particularly limited. As in the present embodiment, both the pairs of divided portions (volume portions and communication portions) obtained by division may be a container-shaped volume portion and a gutter-shaped communication portion. Alternatively, one of the pairs of divided portions may be a container-shaped volume portion and a gutter-shaped communication portion, and the other pair may be a plate-shaped volume portion and a plate-shaped communication portion.

An example of a method of producing the wheel resonator 1 will be described.

First, the first member 21 and the second member 22 are molded by injection molding of thermoplastic resin. Examples of suitably used thermoplastic resin include polypropylene resin and polyamide resin.

Then, the first welding surface of the first member 21 and the second welding surface of the second member 22, both of which are provided on the welding plane WS, are welded to each other, so that the wheel resonator 1 is finished. For welding, vibration welding is preferably performed. A method of producing a wheel resonator includes a step of molding the first member and the second member and a step of welding the first welding surface and the second welding surface to each other on a predetermined welding plane. The volume chamber and the communicating tube are integrally formed by the welding. That is, the method of producing the wheel resonator includes a step of welding the first welding surface and the second welding surface on the same plane. Further, the method of producing the wheel resonator preferably includes a step of molding the first member and the second member by injection molding of synthetic resin.

Actions and effects of the wheel resonator 1 according to the above embodiment will be described.

The wheel resonator 1 according to the above embodiment restrains a variation in the resonance frequency of the wheel resonator 1 even in a case where the welding height varies.

Note that, as is well known, the variation in the welding height means a variation in a degree of proximity between members to be welded. That is, this degree of proximity is an index indicating to what extent both welded members have been closer to or further away from each other in a welding direction during welding.

The resonance frequency $f_0$ of the Helmholtz resonator is generally calculated by using the following Expression 1. Herein, a symbol S denotes the cross-sectional area of the communicating tube 11. A symbol L denotes the length of the communicating tube 11. A symbol V denotes the volume of the volume chamber 12. A symbol c denotes a speed of sound.

$$f_0 = \frac{c}{2\pi}\sqrt{\frac{S}{LV}} \qquad \text{(Expression 1)}$$

In a case where the resonator 1 is formed by welding the first member 21 and the second member 22, a distance at which the first member 21 and the second member 22 are close to each other at the welded portion 14 is changed due to, for example, a change in various conditions at the time of welding. Therefore, it is difficult to completely avoid a change in the so-called welding height. When the welding height varies, the volume V of the volume chamber 12 varies.

Herein, when the wheel resonator 1 is provided to have a flat shape along the outer surface of the wheel, dimension accuracy of the volume chamber 12 in the wheel radial direction greatly influences on a change in the volume V of the volume chamber 12. For example, there will be described a case where the volume chamber 12 having 10 mm as a height in the radial direction is welded on the welding plane WS extending in the circumferential direction and the width direction of the wheel. In this case, just when the height of the volume chamber 12 in the radial direction is changed by 1 mm due to a variation in the welding height, the volume V of the volume chamber 12 is changed by 10%.

According to Expression 1, when the volume V of the volume chamber 12 is increased or decreased by approximately 10%, the resonance frequency is changed by nearly 5%. When the resonance frequency largely deviates, a silencing effect is lost. Therefore, in the related art, a change in the volume V of the volume chamber 12, e.g., a variation in the welding height is restrained as much as possible by strict production management and the like. This is disadvantageous in terms of production efficiency and a production cost.

In the wheel resonator 1 of the above embodiment, not only the volume chamber 12 but also the communicating tube 11 is finished by welding two members obtained by dividing the wheel resonator 1 on the welding plane WS common to the volume chamber 12 and the communicating tube 11. Therefore, when the welding height is changed, not only the volume V of the volume chamber 12 but also the cross-sectional area S of a cross-section of an opening of the communicating tube 11 is changed. Thus, an influence of a change in the volume V of the volume chamber 12 caused by a variation in the welding height and an influence of a change in the cross-sectional area S of the communicating tube 11 caused by a variation in the welding height are offset each other. In this way, it is possible to reduce an influence of the variation in the welding height on the resonance frequency.

In the wheel resonator 1 of the above embodiment, it is assumed that an error of a unit length (e.g., 1 mm) occurs in the welding height. A change in the volume generated in the volume chamber 12 due to the error of the unit length in the welding height at this time is denoted by $\Delta V$. The symbol $\Delta V$ is typically an amount in proportion to a projected area of the volume chamber 12 as seen along the welding direction. Further, a change in the cross-sectional area generated in the communicating tube 11 due to the error of the unit length in the welding height is denoted by $\Delta S$. The symbol $\Delta S$ is typically an amount in proportion to a width W of the cross-section of the opening of the communicating tube 11 as seen along the welding direction.

A resonance frequency $f_e$ obtained when the change $\Delta V$ in the volume and the change $\Delta S$ in the cross-sectional area are generated is expressed by Expression 2.

$$f_e = \frac{c}{2\pi}\sqrt{\frac{(S+\Delta S)}{L(V+\Delta V)}} \qquad \text{(Expression 2)}$$

According to the wheel resonator 1 of the above embodiment, the cross-sectional area $(S+\Delta S)$ of the communicating tube 11 is increased as the volume $(V+\Delta V)$ of the volume chamber 12 is increased due to a change in the welding height. Therefore, a change in values in a square root of Expression 2 is small. Thus, according to the wheel resonator 1 of the above embodiment, it is understood that a variation in the resonance frequency of the wheel resonator 1 is restrained even in a case where the welding height varies.

Hereinafter, the above effects will be described more specifically.

A case where $\Delta S/\Delta V$ is $\alpha$ times as much as S/V (Expression 3) will be described. Herein, a change in the volume and a change in the cross-sectional area of the communicating tube 11, which are generated due to an error of the unit length in the welding height, are denoted by $\Delta V$ and $\Delta S$, respectively. As illustrated in FIG. 5, in a case where cross-sections of the communicating tube 11 and the volume chamber 12 as seen along the circumferential direction have a rectangular shape, a radial-direction height of the communicating tube 11 is denoted by HC, and a radial-direction height of the volume chamber 12 is denoted by HV, Expression 3 is automatically satisfied when HC is $\alpha$ times as much as HV.

$$\frac{\Delta S}{\Delta V} = \alpha \frac{S}{V} \qquad \text{(Expression 3)}$$

Expression 2 is rearranged by using Expression 3 to make Expression 4.

$$f_e = \frac{c}{2\pi}\sqrt{\frac{S}{LV}\left(\frac{1+\alpha\Delta V/V}{1+\Delta V/V}\right)} \qquad \text{(Expression 4)}$$

According to Expression 4, in a case of $\alpha=1$, a variation in the resonance frequency is restrained most effectively. In this case, even in a case where the change $\Delta V$ in the volume and the change $\Delta S$ in the cross-sectional area are generated due to a variation in the welding height, it is possible to avoid or restrain a variation in the resonance frequency.

Further, according to Expression 4, in a case where a falls within the range of 0.5 to 1.5, it is found that, even in a case where the volume V is changed by 10% due to a variation in the welding height, a variation in the resonance frequency can be equal to or less than 2.3%. In the related art, when the volume is changed by 10% due to a variation in the welding height, the resonance frequency is changed by nearly 5%.

That is, in a case where $\Delta S/\Delta V$ is 0.5 to 1.5 times as much as S/V, a variation in the resonance frequency can be reduced by at least half, as compared to the related art. Herein, a change in the volume and a change in the cross-sectional area of the communicating tube 11, which are generated due to an error of the unit length in the welding height, are denoted by $\Delta V$ and $\Delta S$, respectively. In view of reducing a variation in the resonance frequency, $\Delta S/\Delta V$ is more preferably 0.7 to 1.3 times as much as S/V, and $\Delta S/\Delta V$ is particularly preferably 0.8 to 1.2 times as much as S/V.

Further, in a case where the cross-sections of the communicating tube 11 and the volume chamber 12 as seen along the circumferential direction have a rectangular shape, a relational expression regarding the volume V of the volume chamber 12 and the cross-sectional area S of the communicating tube 11 can be replaced with a similar relational expression regarding the radial-direction height HV of the volume chamber 12 and the radial-direction height HC of the communicating tube 11.

Therefore, in this case, in a case where HC is 0.5 to 1.5 times as much as HV, it is found that a variation in the resonance frequency can be reduced by at least half, as compared to the related art. Note that the radial-direction height of the communicating tube 11 is denoted by HC, and the radial-direction height of the volume chamber 12 is denoted by HV. In view of reducing a variation in the resonance frequency, HC is preferably 0.7 to 1.3 times as much as HV, and HC is particularly preferably 0.8 to 1.2 times as much as HV.

The present disclosure is not limited to the above embodiment. The above embodiment can be variously modified. Hereinafter, other embodiments of the present disclosure will be described. In the following description, different portions from those of the above embodiment will be mainly described. Meanwhile, detailed description of similar portions will be omitted. Further, part of those embodiments may be combined with each other, or part of those embodiments may be replaced with part of other embodiments.

In the above embodiment, actions and effects of an example where the cross-sections of the communicating tube 11 and the volume chamber 12 as seen along the circumferential direction have a rectangular shape have been described. However, the cross-sections of the communicating tube 11 and the volume chamber 12 as seen along the circumferential direction do not need to have a rectangular shape. Instead of this, the cross-sections may have another shape such as a circular shape, an oval shape, or an egg shape. Further, radial-direction heights of the cross-sections of the openings of the volume chamber 12 and the communicating tube 11 may be changed across the circumferential direction.

In such a case, when V/SP described below is used as the radial-direction height HV of the volume chamber and S/W described below is used as the radial-direction height HC of the cross-section of the opening of the communicating tube, effects similar to those of the above embodiment are obtained. Herein, V/SP is an amount obtained by dividing the volume V of the volume chamber 12 by a projected area SP obtained when the volume chamber 12 is projected in the welding direction. S/W is an amount obtained by dividing the cross-sectional area S by a dimension W of the cross-section of the communicating tube 11 in the wheel width direction.

A specific structure for fixing the wheel resonator 1 of the above embodiment to the wheel 99 is not particularly limited. An attaching method using another structure may be used. Examples of another structure include an attaching bolt and an attaching band. Further, an example where the attaching portions 13 are provided in the second member 22 has been described in the description of the above embodiment. Instead of this, the attaching portions 13 may be provided in the first member 21. A specific form in this case is not particularly limited.

Further, the wheel resonator 1 of the above embodiment can be used not only for a wheel for an automobile but also for a wheel for a motorcycle. A specific use of the wheel is not particularly limited. Further, a target resonance frequency of the wheel resonator 1 may be set for individual uses or the like.

Figure 6:
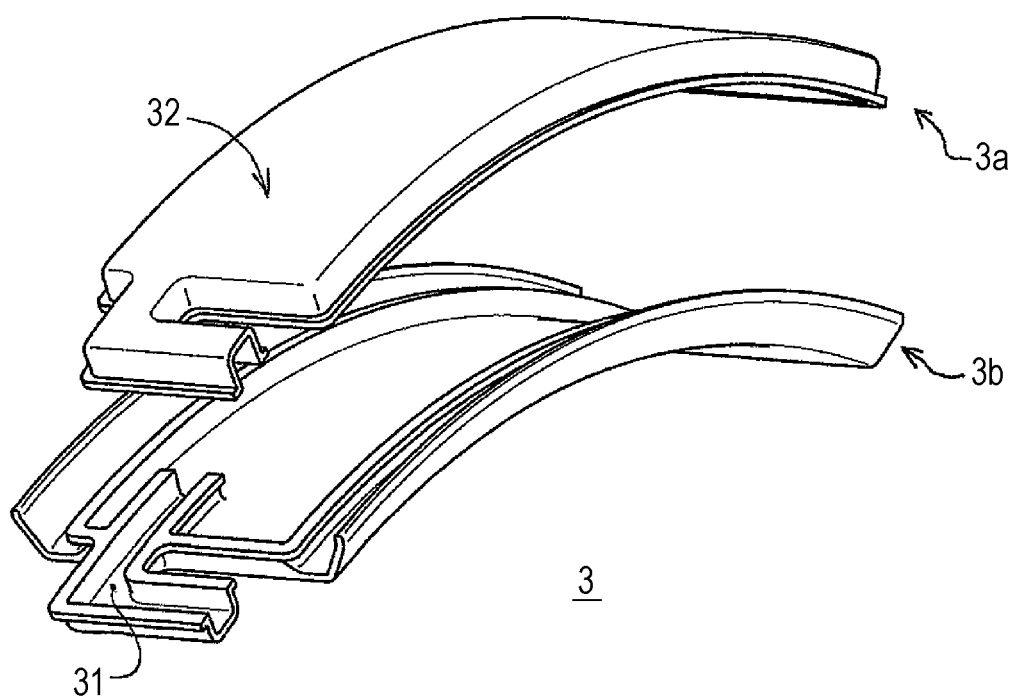
FIG. 6 is a perspective view illustrating constituent members and a structure of a wheel resonator according to a second embodiment.

FIG. 6 illustrates a wheel resonator 3 of a second embodiment. FIG. 6, as well as FIG. 4, is a perspective view illustrating a state before welding. The wheel resonator 3 of the present embodiment is the same as that of the first embodiment in the following respects. The wheel resonator 3 is produced by welding a first welding surface of a first member 3a and a second welding surface of a second member 3b. Further, a communicating tube 31 and a volume chamber 32 are divided on a welding plane to which both the first welding surface and the second welding surface belong. Furthermore, the communicating tube 31 is provided along the welding plane.

In the present embodiment, the communicating tube 31 has a shape bent along the welding plane. Further, part of the communicating tube 31 extends in the width direction of the wheel. Also in such a form, as well as in the wheel resonator 1 of the first embodiment, it is possible to reduce a variation in the resonance frequency.

Figure 7:
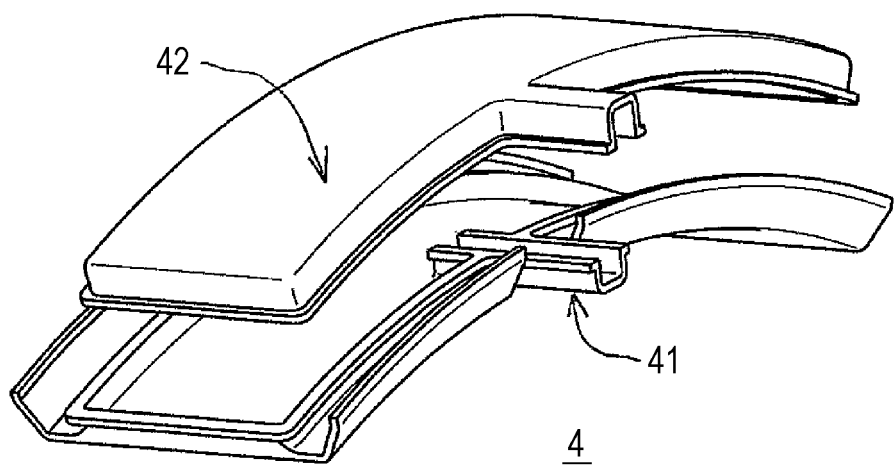
FIG. 7 is a perspective view illustrating constituent members and a structure of a wheel resonator according to a third embodiment.

Further, FIG. 7 illustrates a wheel resonator 4 of a third embodiment. In the present embodiment, a communicating tube 41 is provided to extend, from a volume chamber 42, along the width direction of the wheel. Also in such a form, as well as in the wheel resonator 1 of the first embodiment, it is possible to reduce a variation in the resonance frequency. That is, the communicating tube 41 may extend in the width direction of the wheel.

Further, in the description of the above embodiment, an embodiment in which part of the communicating tube is provided to protrude toward the outside of the volume chamber has been described. However, a form in which the communicating tube is provided is not limited thereto. Instead of this, the whole communicating tube may be disposed inside the volume chamber. For example, when the communicating tube is made up of a rib provided to partition the inside of a portion serving as the hollow volume chamber, the whole communicating tube can be positioned inside the volume chamber.

Further, in the description of the above embodiment, there has been described a form in which an opening end of the communicating tube is opened in the circumferential direction or width direction. That is, in the first embodiment, the opening end of the communicating tube is opened in the circumferential direction. In the second embodiment and the third embodiment, the opening end of the communicating tube is opened in the width direction. However, a form of the communicating tube is not limited to those embodiments. For example, the end of the communicating tube may be opened in the radial direction. For example, the resonator may be configured so that the communicating tube is provided to have a rib provided to partition the volume chamber and a hole that penetrates in the radial direction and functions as an opening end of the communicating tube is provided at a predetermined position. A direction in which the communicating tube is opened is not particularly limited.

Although omitted in the description of the above embodiment, rigidity of the volume chamber is preferably improved by providing reinforcing ribs and/or bosses in the volume chamber as appropriate and connecting a rib and/or a boss on the first member side to a rib and/or a boss on the second member side.

The wheel resonator can be used for, for example, a wheel for a vehicle. The wheel resonator can reduce a road noise and therefore has high industrial utility.

The wheel resonators according to the embodiments of the present disclosure may be the following fourth to sixth wheel resonators.

The fourth wheel resonator is a wheel resonator including a volume chamber and a communicating tube and attached for use to a vehicle wheel, in which: the volume chamber is formed to have a flat shape extending along an outer surface of a wheel and the wheel resonator is provided by welding a first member made of synthetic resin and positioned on the outside in a radial direction to a second member made of synthetic resin and positioned on the inside in the radial direction on a predetermined welding plane; the welding plane is a cylindrical plane extending in a circumferential direction and a width direction of the wheel; the communicating tube is provided to extend along the welding plane; and a volume portion obtained by dividing the volume chamber on the welding plane in the radial direction of the wheel and a communication portion obtained by dividing the communicating tube on the welding plane in the radial direction of the wheel are integrally provided in each of the first and second members.

The fifth wheel resonator according to the above fourth wheel resonator is a resonator in which ΔS/ΔV is 0.5 times to 1.5 times as much as S/V, where a volume of the volume chamber is denoted by V, a cross-sectional area of the communicating tube is denoted by S, a change in the volume generated in the volume chamber due to an error of a unit length in a welding height is denoted by ΔV, and a change in the cross-sectional area generated in a cross-section of an opening of the communicating tube due to the error of the unit length in the welding height is denoted by ΔS.

The sixth wheel resonator according to the above fourth wheel resonator is a resonator in which HV is 0.5 times to 1.5 times as much as HC, where a height of a cross-section of an opening of the communicating tube in a wheel radial direction is denoted by HC and a height of the volume chamber in the wheel radial direction is denoted by HV.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A wheel resonator, comprising:
   a first member having a first welding surface;
   a second member integrated with the first member by welding, the second member having a second welding surface;
   a volume chamber; and
   a communicating tube, wherein:
     the volume chamber is configured to extend along an outer surface of a vehicle wheel when the wheel resonator is attached to the vehicle wheel, wherein the volume chamber has a smaller dimension in the radial direction than dimensions in the circumferential direction and the width direction;
     the first welding surface and the second welding surface are welded to each other, and are provided on a single welding plane;
     the single welding plane extends in a circumferential direction and a width direction of the vehicle wheel when the wheel resonator is attached to the vehicle wheel, the volume chamber being divided into two volume portions by the single welding plane, and the communicating tube being divided into two communicating portions by the single welding plane; and
     the communicating tube extends along the single welding plane.

2. The wheel resonator according to claim 1, wherein ΔS/ΔV is 0.5 times or more and 1.5 times or less as much as S/V,
   where a volume of the volume chamber is denoted by V, a cross-sectional area of the communicating tube is denoted by S, a change in the volume generated in the volume chamber due to an error of a unit length in a welding height is denoted by ΔV, and a change in the cross-sectional area generated in a cross-section of an opening of the communicating tube due to the error of the unit length in the welding height is denoted by ΔS.

3. The wheel resonator according to claim 1, wherein HV is 0.5 times or more and 1.5 times or less as much as HC,
   where a height of a cross-section of an opening of the communicating tube in a radial direction of the wheel is denoted by HC and a height of the volume chamber in the radial direction of the wheel is denoted by HV.

4. The wheel resonator according to claim 1, wherein the first member and the second member are made of synthetic resin.

5. The wheel resonator according to claim 1, wherein the communicating tube is configured to extend from the volume chamber in the circumferential direction or width direction of the vehicle wheel when the wheel resonator is attached to the vehicle wheel.

6. The wheel resonator according to claim 1, wherein the communicating tube is configured to have a shape bent along the single welding plane when the wheel resonator is attached to the vehicle wheel.

7. A method for producing the wheel resonator according to claim 1, comprising:
   molding the first member and the second member; and
   welding the first welding surface and the second welding surface to each other, wherein the volume chamber and the communicating tube are integrally provided by the welding.

8. The method for producing the wheel resonator according to claim 7, wherein
   the first member and the second member are molded by injection molding of synthetic resin.

* * * * *